April 15, 1969

R. H. LEE 3,439,198

ELECTRICAL ACTUATOR HAVING A MECHANICAL OUTPUT

Filed Dec. 27, 1965

INVENTOR.
ROBERT H. LEE
BY
Andrus & Starke
ATTORNEYS

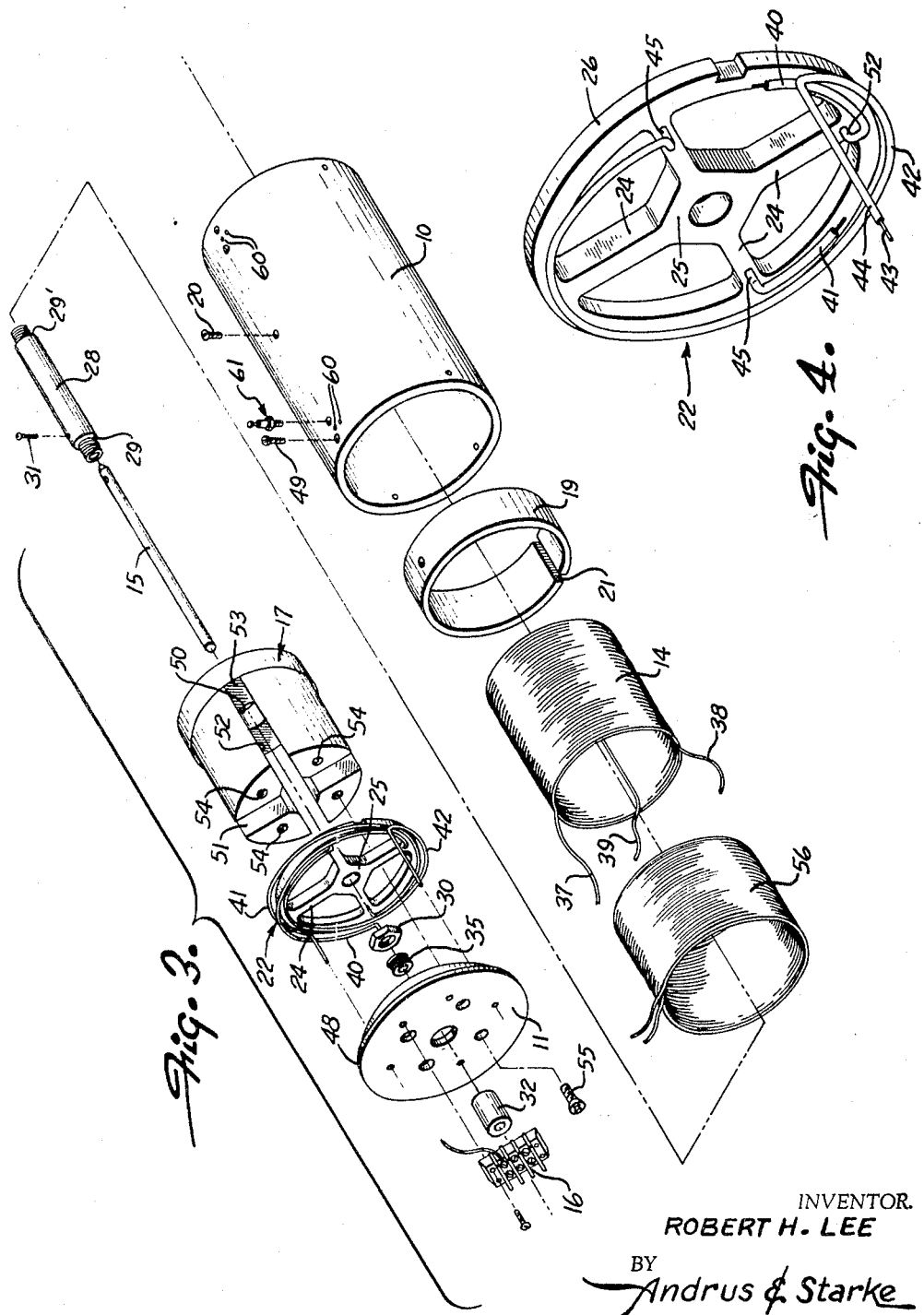

United States Patent Office 3,439,198
Patented Apr. 15, 1969

3,439,198
ELECTRICAL ACTUATOR HAVING A MECHANICAL OUTPUT
Robert H. Lee, 2820 Terraza Place,
Fullerton, Calif. 92632
Filed Dec. 27, 1965, Ser. No. 516,371
Int. Cl. H02k 41/02
U.S. Cl. 310—13                        5 Claims

ABSTRACT OF THE DISCLOSURE

The present disclosure is related to an electrically responsive actuator for producing a mechanical movement. The actuator includes a pair of oppositely disposed permanent cylindrical magnets terminating in spaced relation. The magnets are secured to end caps of a cylindrical housing to form a magnetic frame. A flux concentrating ring is mounted within the central portion of the housing to concentrate the flux within the air gap immediately adjacent the inner ends of the permanent magnets. A coil is supported at the opposite ends by similar spider end members carried by a central supporting rod or shaft assembly.

---

This invention relates to an electrical actuator having a mechanical output and particularly to a linear actuator for producing an extremely fast and powerful movement in response to an electrical input signal.

In industrial controls and the like, a load controlling member is often physically positioned to control the output characteristics of a load device. In many applications, substantial forces must be generated in response to a relatively small control signal to overcome the frictional forces inherent in mechanical devices and the like as well as to provide rapid response in repositioning of the member. Such control however must be such that the adjusting movement does not cause instability by over-correction in response to the signal. The output of the device must however be sufficient to respond quickly to input signals to move the control device or member notwithstanding frictional forces. For high speed response, the electrical actuator should employ a minimal moving mass to permit quick starting and stopping as the electrical signal changes from one level to another. Further, for rapid response the electrical system must be designed to minimize the electrical time lag involved in any electrical apparatus. Such systems may also be damped such that they will rapidly settle to the control point.

The present invention is particularly directed to an electrically responsive linear actuator for producing a mechanical movement. Although it may be employed in any system requiring relatively large forces with rapid response, a particular application with which the invention has been employed is an electric governor for controlling the speed of an internal-combustion engine forming the drive for a generator. The frequency of the generator output which is related to the generator speed was regulated by controlling the fuel supplied to the engine in response to the generator output frequency. In connection with such engine controls and the like, the electrical actuator must also be relatively insensitive to environmental conditions such as vibration, varying temperatures, dust and other similar deleterious elements.

The present invention is particularly directed to an electromagnetic linear actuator having a minimum moving mass and electrical time lag and producing a relatively high output force with an extremely fast response to input signals. Further, the actuation and output of the linear actuator is essentially independent of the position of the actuator.

Generally, in accordance with the present invention, a rectilinearly moving output member is slidably mounted as a part of a lightweight coil support to which an annular actuating winding or coil is secured. The coil assembly is slidably mounted within a suitable frame assembly including a centrally located permanent magnet carried by and forming a part of an annular outer magnet return frame to define an annular gap therebetween within which the coil moves. In a preferred construction, the magnet assembly includes a pair of oppositely disposed permanent cylindrical magnets terminating in spaced relation. The magnets are secured to end caps of a cylindrical housing; with the housing and the end caps defining the return path for the flux of the permanent magnets. A flux concentrating element is mounted within the central portion of the housing to concentrate the flux within the air gap immediately adjacent the inner ends of the permanent magnets. The coil assembly includes end spider supports carried by a central supporting rod or shaft assembly and with the arms of the spider projecting radially outwardly through slots formed in the permanent magnets. A coil is secured to the outer ring portions of the spider members for movement within the central air gap and connected to spring contacts between the end cap and one spider to permit energization of the coil.

Energization of the coil develops a corresponding reaction force which is transmitted to the coil support assembly and thus to the output member. The coil moves in opposite directions in accordance with the direction of current flow through the coil. Alternately, a center tapped coil may be used and current passing from the center tap to a coil end causes opposite forces when the electrical circuit is through opposite coil ends.

The assembly has been found to provide a linear actuator with the output force essentially independent of the position of the coil as long as it is maintained within the air gap defined by the central flux concentrating ring and the adjacent portions of the permanent magnets.

The present invention thus provides a reliable and relatively simple linear actuator which generates a substantial mechanical force, with a rapid response. The actuator can be constructed such that it is not affected substantially by environmental conditions.

The drawings furnished herewith illustrate a preferred construction of the present invention and clearly disclose the above advantages and features as well as others related to the illustrated construction which will be clear from the following description.

In the drawings:

FIG. 3 is a pictorial view partly exploded to more clearly show details of the construction shown in FIG. 2; and FIG. 4 is an end view showing a single contact spring connection.

Figure 1:
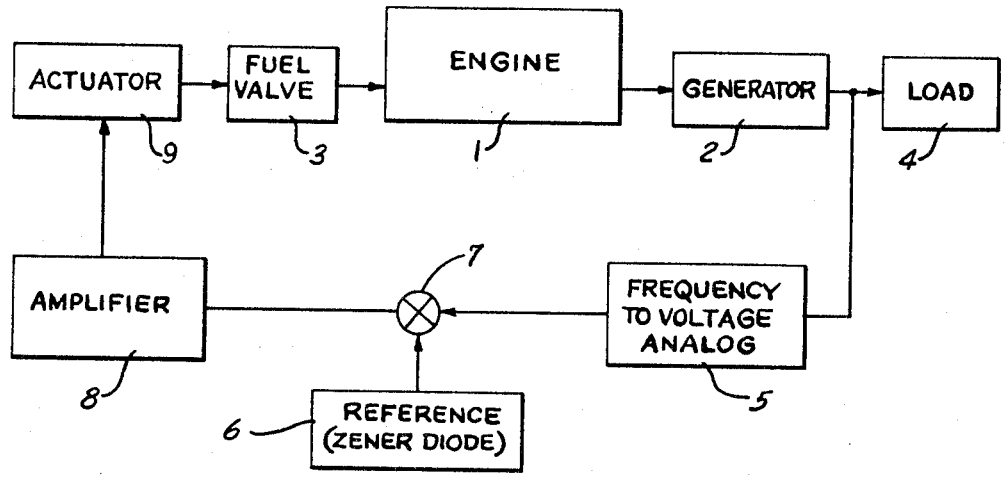
FIG. 1 is a simplified block diagram of an engine generator employing a closed loop servo system for maintaining the output frequency of the generator at a predetermined frequency.

Referring to the drawings and particularly to FIG. 1, the present invention is shown in connection with a prime mover 1 which may be a diesel or gasoline internal-combustion engine coupled to drive an alternating current generator 2. The prime mover 1 includes a throttle or fuel valve unit 3 interconnected to an input linkage for controlling the position of the valve and thereby the fuel-air mixture to the engine 1. This in turn will control the speed of the prime mover 1 and the speed of the generator 2 which is connected to energize a suitable load 4. For the purposes of clearly explaining the present invention, it will be assumed that the generator 2 is to be operated at a preselected frequency which in itself may be adjusted. For example, specifications often require that the generator operate at any one of a plurality of frequencies such as 50 cycles per second, 60 cycles per second or 400 cycles per second with the frequency being regulated by sensing the output speed of the generator 2. In the illustrated embodiment of the invention, a suitable speed or frequency sensor 5 is connected to and operates from the generator output to provide an output voltage signal related to the frequency output of the generator 2. A reference voltage source 6 such as a Zener diode type unit is also provided and may be adjustable for establishing an output voltage signal corresponding to the desired output frequency of the generator 2. The sensor 5 and the reference source 6 have their outputs connected to a suitable comparator or summation device 7, which will compare the signals and generate an error signal. The error signal is applied to a suitable amplifying unit 8 to generate amplified control signals suitable to operate an actuator 9. The actuator 9 is connected to the throttle valve unit 3 and drives it in response to the applied amplified error signal. The actuator 9 particularly forms the subject matter of the present invention and is more fully described hereinafter in connection with FIGS. 2 and 3.

Generally, the illustrated embodiment of the invention operates in accordance with closed loop servo theory. If the generator is operating to provide an output frequency corresponding to that set by the reference source 7, the output of the summing unit or comparator 8 will be zero such that the actuator 9 is held in the then operating position. If, however, the engine speed varies either upwardly or downwardly correspondingly an error voltage is delivered to the amplifier 8, the direction of the error voltage being that which when amplified and applied to the actuator 9 will cause a correction in the position of unit 3 suitable to restore the system to the preset operating frequency.

Figure 2:
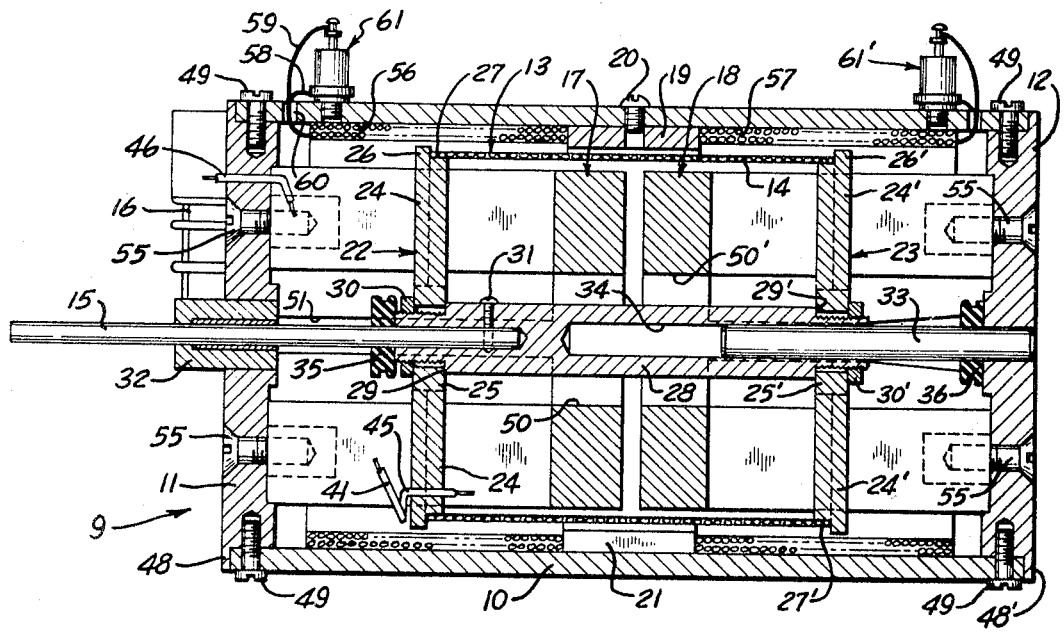
FIG. 2 is an enlarged vertical cross section showing the details of the linear actuator of the present invention.

The linear actuator 9 of the present invention is shown in a preferred construction in FIGS. 2 and 3. Generally, the illustrated actuator 9 includes a cylindrical tubular housing 10 closed at the opposite end by end plates or caps 11 and 12. A coil assembly 13 is mounted within the housing 10 and, in the illustrated embodiment, includes an annular center tapped coil 14 disposed adjacent the outer portion of the housing and an actuator shaft 15 coaxially located with the housing 10. A terminal strip 16 is connected to the end cap 11 and provides direct current electrical connections to the center tapped coil 14 as hereinafter described. A pair of permanent magnets 17 and 18 is disposed in axially spaced relation within the housing 10 and coil 14 and secured to the end caps 11 and 12 respectively. The magnets 17 and 18 are oppositely magnetized in an axial direction to produce oppositely directed fields which are completed through the housing 10 and the respective end caps which are formed of a magnetic material such as soft iron. Additionally, each magnetic field is concentrated adjacent the center portion of the assembly by a magnetic flux concentrating ring 19 of soft iron or the like which is centrally secured within the housing 10. In operation, the coil 14 is held within the air gap between ring 19 and the magnets 17 and 18. Energizing of either half of the coil 14 generates an electromagnetic field which produces a reaction force with the field of the permanent magnets 17 and 18 and in accordance with known theory generates an axial force on the coil assembly 13 which includes the rod or shaft 15. Energization of one half of coil 14 causes the shaft 15 to move toward the front end cap 11, and similarly, energizing of the opposite half of coil 14 causes the assembly to move in the opposite direction.

The center tapped coil 14 provides one convenient way of reversing the magnetomotive force. The force reversal can however be obtained with a single coil and a direct current amplifier having a reversible output. This is the more convenient structure when the power source is the alternating current output of a generator.

More particularly, the housing 10 is generally a tubular member formed of soft iron or other similar magnetic material adapted to provide a highly permeable path to the flux generated or created by the adjacent magnets 17 and 18. The inner concentric ring 19 reduces the air gap between the housing 10 and the magnets at the central location and consequently most of the flux will tend to be concentrated within the area of the ring rather than being distributed throughout the axial length of the gap between the housing and the magnets. The illustrated ring 19 is secured in position by a small clamping bolt 20 which extends through the housing 10 and threads into a suitable aligned opening in the ring. Additionally, diametrically opposite from the clamping bolt 20 the ring is split as at 21 to prevent formation of a short circuited turn. The ring 19 is thus peripherally spaced from the periphery of the magnets 17 and 18 and defines an air gap slightly larger than the thickness of the coil 14 which in the illustrated embodiment of the invention is shown as a single layer spirally wound coil.

The diameter of the coil 14 is designed to fit centrally within the gap between the ring 19 and the permanent magnets 17 and 18 and projects axially in opposite directions therefrom. The outer ends are spaced from the end caps 11 and 12 by a selected amount predetermined by the desired movement of the coil assembly. Thus, in the illustrated embodiment of the invention, the axial length of the coil 14 is selected to be approximately one-half that of the housing and the outer ends are thus located at the quarter points in the length of housing 10.

The annular coil 14 is slidably supported within the housing as a part of the coil assembly 13. The coil 14 may be a single layer and self-supporting coil which is held between a front spider member 22 and a similar rear spider member 23 forming a part of assembly 13. The coil thickness is maintained low in order to provide minimum mass, and an optimum magnetic path; i.e. the magnetic path should have a minimal air gap.

Each of the spiders is similarly formed and spider member 22 will be described in detail.

The spider member 22 includes four radial arms 24 disposed generally by 90° with respect to each other and integrally secured at the inner end to a mounting hub 25 and at the outer end to a support ring 26 having an outer diameter slightly larger than the diameter of the coil 14. The arms 24 define an inwardly projecting support flange 27 with a radius corresponding to that of coil 14. The end of coil 14 is secured to the flanges 27 with the end face of the coil abutting on the support ring 26. A central support rod 28 is provided with reduced threaded ends which project through the spider hubs 25 and 25′, respectively. The reduced end defines clamping shoulders 29 against which the hubs 25 abut and are secured by a suitable clamping nut 30. The assembly 13 is supported at the forward end by the operating shaft 15 which projects inwardly into an axial opening or recess in the end of the support rod 28 and is secured thereto as by a pin 31. The shaft 15 is journaled in a sleeve bearing 32 secured within cap 11 to slidably support the corresponding end of assembly 13. The opposite end of the assembly 13 is slidably supported on a shaft 33 which is secured to the back end cap 12 and projects forwardly into a recess or opening 34 in the back end of the support rod 28. The recess 34 is of a sufficient length to permit rearward movement of the assembly as hereinafter described.

In the illustrated embodiment of the invention, rubber bumpers 35 and 36 respectively encircle shafts 15 and 33 to prevent shock damage which might result from ramming movement of the carrier assembly into the end caps 11 or 12.

As previously noted, the supported coil 14 is described as a center tapped winding. As shown most clearly in FIG. 3, coil 14 includes end leads 37 and 38 and a central common lead 39. The leads 37, 38 and 39 are circumferentially spaced and the back lead 38 and the common lead 39 project outwardly along the inner surface of the coil 14 to the forward spider member 22. The leads 37 and 38 are connected to the terminal block 16 through individual insulated conductive springs 40, 41 and 42, respectively. Each of the springs 40–42 is similarly formed and the one spring 40 is described and more fully shown in FIG. 4. The spring 40 is formed of a small diameter spring wire 43 of beryllium copper or the like and insulated by Teflon tubing 44. The spring 40 is a partial convolution of a diameter substantially corresponding to that of the spider 22 and of a length of approximately 330°. The one end is bent radially inwardly and then axially inwardly as at 45 with the innermost end embedded within and extending through an arm 24 of the front spider member 22 immediately adjacent the outer ring 26. This provides a terminal projection to which the corresponding lead 37 is secured. The opposite end of spring 40 is bent axially outwardly and is embedded within and projects through the end cap 11 as at 46, in FIG. 2. A suitable wire connector 47, as shown in FIG. 4, may connect terminal portion 46 to the appropriate terminal on strip 16.

The small diameter springs 40–42 impose a negligible restraining force on the moving coil assembly 13 regardless of its axial position with respect to the front end cap 11. The springs 40–42 are angularly offset approximately 120° with respect to each other to provide spaced physical connections to the several arms 24 of the spider member 22 and in the cap 11 to substantially eliminate any interference between the action of the springs as the coil assembly 13 moves with respect to the cap 11.

The end plates or caps 11 and 12 are generally flat plate-like members having an outer edge recess to fit within the ends of the housing 10 with an outer flange 48 abutting against the end edges of the housing 10. The caps 11 and 12 are shown secured in place by suitable screws 49 which project through suitable openings in the housing and thread into correspondingly tapped openings in the caps. The bearing 32 is press fitted within a suitable opening in cap 11 and shaft 33 is similarly secured within the rear cap 12.

The permanent magnets 17 and 18 are similarly constructed and secured one each to the caps 11 and 12 to permit movement of coil assembly 13, as follows. Magnet 17 is particularly described with the corresponding portions of magnet 18 similarly identified by primed numbers for simplicity and clarity of explanation. For purposes of simplicity of illustration, the magnet 18 and related support has not been separately shown in the exploded view of FIG. 3.

Referring particularly to FIGS. 2 and 3, the magnet 17 is generally a solid cylindrical member having a central opening 50 somewhat larger than the diameter of the central support rod 28 of coil assembly 13 such that it may freely move therethrough. A pair of perpendicularly related slots 51 and 52 are formed in the outer end of magnet 17 and define an annular or ring base 53 aligned with the one-half of ring 19. The permanent magnet 17 is properly held within the housing by the provision of tapped openings 54 in each of the end faces of the arm portions defined by the slots 51 and 52. Clamping screws 55 pass through the end plate 11 and thread into the correspondingly tapped openings 54. The radial arms 24 of the spider member 22 extend through the corresponding slots 51 and 52 such that free movement thereof is permitted.

The permanent magnets 17 and 18 are polarized in an axial direction and establish a magnetic field in the air gap between the magnet bases 53 and 53' and the flux ring 19 through which coil 14 passes. The magnets 17 and 18 are oppositely polarized to provide similar poles at the center and the field passes through the outer soft iron housing 10 to the corresponding end caps in opposite directions through the housing, with respect to the center ring 19.

In operation, when a direct current is caused to flow from the center tap lead 39 to end lead 37, the coil 13 develops a magnetic field which reacts with the fields of permanent magnets 17 and 18 to generate a physical force moving the coil assembly 13 in a related direction and thereby creating a rectilinear motion of the positioning shaft 15 and to the load; for example, the throttle valve unit 3. When D.C. is passed through the other half of the coil 14, that is, from the center tap lead 39 to the opposite end lead 38, an oppositely directed physical force is exerted on the coil assembly 13 to move the shaft 15 in an opposite direction. Thus, passing current from a coil center tap to one end causes a magnetic field opposite in direction from that caused by passing current from a center tap to the opposite end. This change of ends is equivalent to reversing current flow through a non-center tapped coil, which as previously noted can be employed if desired.

The amount of force delivered is essentially independent of the coil position as long as a portion of the coil 14 remains under the concentrating ring 19 through which essentially all of the flux of the permanent magnets 17 and 18 passes. The length of the coil 14 and the soft ring 19 determine the linear force movement which can be obtained. Obviously, the desired movement or amount of travel can be obtained by proper dimensioning of the actuator.

For practical reasons, the permanent magnets 17 and 18 are preferably assembled in the nonmagnetized state. In the illustrated embodiment of the invention, similar magnetizing coils 56 and 57 are located one each to the opposite sides of the soft iron flux concentrating ring 19. Each of the coils 56 and 57 is similarly formed and coil 56 is described. The coil 56 has an outer diameter corresponding to the inner diameter of housing 10 and an inner diameter slightly less than the soft iron ring 19 such to prevent interference with the movement of the coil assembly 13. The inner end of the coil 56 abuts the end face of soft iron ring 19. A ground lead 58 and a power lead 59 are provided at the axially outer end and extend through a suitable adjacent opening 60 in the housing 10. An insulated stand-off terminal 61 is secured to the housing immediately adjacent the opening and connects the lead 58 to the housing 10 to provide a ground connection and defines a positive input terminal for lead 59.

Coil 57 is similarly formed and mounted to the opposite side of ring 19 and terminates in an insulated stand-off terminal 61'. After assembly of the several components, coils 56 and 57 are energized with a suitable D.C. to magnetize the magnets 17 and 18. Additionally, the permanent mounted of the magnetizing coils 56 and 57 permits subsequent demagnetization of the magnets 17 and 18 and thus facilitates disassembly of the unit for servicing or other repair.

The operation of the illustrated embodiment of the actuator as forming a part of the servo system of FIG. 1 is briefly summarized as follows. After ending 1 is started and is driving the generator 2 at a preselected frequency, the coil assembly 13 is assumed to be centrally located within the housing 10, as shown in FIG. 2. If for any reason the generator speed is increased, the output signal of the sensor 5 will increase and provide a correspondingly related error signal. This will be compared by the summing unit or comparator 7 with the preset related frequency signal from source 6 and generate a positive error signal. The error signal is amplified by amplifier 8 and impressed on the actuator 9. Consequently, half of the coil 14 between common lead 39 and the forward end lead 37 is energized and establishes a magnetic reaction force causing the actuator 9 to move, reducing the opening of the throttle valve unit 3 and reducing the speed of the internal-combustion engine proportionately.

If the generator speed decreases below the set value by a selected amount, the output signal of sensor 5 is correspondingly reduced and a proportionate error signal of opposite polarity to the aforesaid error signal is formed at the output of the comparator 7. This is amplified and fed to the actuator 6. This produces an opposite reaction force with respect to the permanent magnets 17 and 18 moving the coil assembly 13 towards the back cap 12 and in an opposite direction. This opposite movement reverses the positioning of the throttle valve unit 3 to increase the air-fuel mixture to the engine 1 which increases its speed and that of the generator 2. The correction of the generator speed returns the output frequency to the preselected reference.

The adjustment of the throttle valve unit 3 or other load occurs very rapidly as a result of the substantial operating force generated on rod 15, the relatively low mass of the coil assembly 13 and the minimal lag due to the low inductance to resistance ratio of coil 14. The system thus proves very rapid and sensitive response to the variations in signals. The correction is therefore limited essentially by the time response of the engine which generally is rapid. Thus, corrected torque may be applied in minimum time.

The force acting on the coil assembly 13 is essentially independent of the position of the coil 14 as long as the coil 14 is within the air gap between ring 19 and the magnets 17 and 18.

If a substantial error is generated for any reason and a large signal applied to the corresponding half of the actuating coil 14, the coil assembly 13 moves rapidly to one end or the other depending upon the half of the coil energized. The rubber bumpers 35 and 36 absorb the shock forces and essentially prevent any damage to the system as a result of the ramming movement.

In the illustrated embodiment of the invention, the output frequency is directly related to the generator speed and the error signal is generated completely independently of the other components and depends solely on the speed of the generator. It has been found that the present invention will permit very accurate control or regulation of the frequency and after readjustment of the frequency to different speeds will rapidly reset the engine speed to the selected new frequency in a very rapid manner.

Although the actuator has been particularly described in connection with an engine frequency generator, it can also be applied in any other suitable system adapted to generate a suitable direct current proportional to an error to be detected. If a single directional control is desired with a spring return, the system can be correspondingly constructed employing a single half of the assembly with the motion controlled by energization of the winding.

The illustrated mounting of the coil assembly 13 reduces the total mass of the moving parts to a very low or minimum quantity such that essentially the total force is available to overcome friction and load force. Further, the illustrated single layer coil produces an extremely low inductance to resistance ratio and thus essentially minimizes the electrical time lag of the response.

A linear actuator constructed in accordance with the illustrated embodiment of the invention has been made with the housing approximately six inches long and the outer diameter approximately three and one-half inches long. The coil 14 was approximately three inches to permit approximately one and one-half inches of movement with respect to the central location. A square wave input voltage of 28 volts alternating current at a frequency of 30 cycles per second generated a half inch excursion in the unloaded condition. A corresponding moving iron core unit tested to deliver an equivalent force and energy produced an excursion of approximately only one-sixteenth of an inch for a corresponding input.

The present invention thus provides a universal electrically responsive linear actuator for providing accurate positioning of an output member with an extremely fast response and with a sufficient force to overcome the friction forces normally inherent or otherwise provided in mechanical systems and the like.

Various modes of carrying out the invention are contemplated as being within the scope of the following claims particularly pointing out and distinctly claiming the subject matter which is regarded as the invention.

I claim:
1. In a linear electrical actuator,
   a magnetic field assembly including a permanent magnet polarized in an axial direction with a magnetic frame connected to the permanent magnet to form a magnetic circuit having an annular flux gap,
   an output member having a selected maximum output movement greater than the length of the flux gap,
   a tubular electrical coil means mounted for axial movement within said gap and of a length corresponding to the selected maximum output movement of the member,
   end members secured to the ends of the coil means,
   means secured to the end members to slidably support the members and coil means for rectilinear movement within the gap,
   input means to selectively energize said coil means and thereby selectively move said coil means and the attached output member in opposite directions, and
   a second cylindrical coil means concentrically mounted about the magnet and disposed outwardly of the first named cylindrical coil means, said second cylindrical coil means being adapted to selectively magnetize and demagnetize the permanent magnet.

2. The linear electrical actuator of claim 1 wherein said permanent magnet is a cylindrical magnet polarized in an axial direction and having a plurality of circumferentially distributed axially projecting slots, said magnetic frame includes a cylindrical magnetic frame having an end cap secured to the permanent magnet with the permanent magnet concentrically mounted within the frame,
   the first coil means being disposed within the gap between the frame and the magnet and having a length substantially greater than the axial gap length,
   said end members being spider members one each at the opposite end of the coil means and each having an outer support ring to which the first coil means is secured and a hub interconnected to a common center member to form a coil assembly, the ring and hub being connected by a plurality of arms passing through the magnet slots to permit axial movement of the coil assembly,
   a support shaft secured to the end cap and projecting axially through the magnet and into a guide opening in the center member, and
   said output member being secured to the opposite end of the coil center member and slidably mounted to support the opposite end of the coil assembly for rectilinear movement.

3. The linear electrical actuator of claim 1 wherein the magnetic field assembly includes a pair of permanent magnets polarized in an axial direction and wherein said magnetic frame is a cylindrical frame having an end closure member, the permanent magnets being secured one each to the end closure members with the permanent magnet projecting inwardly therefrom with corresponding poles immediately adjacent the central portion of the frame, a magnetic ring secured to the frame at the central portion of the frame to reduce the air gap and thereby concentrate the flux therethrough, said first coil means including a cylindrical coil disposed within the gap between the frame and the magnet, said second coil means including a pair of coils located one each to opposite sides of the magnetic ring concentrically aligned with the pair of magnets and having terminal means, said coils being adapted to be connected to a direct current source to selectively magnetize and demagnetize the permanent magnets.

4. The linear electrical actuator of claim 1 for providing a fast and large mechanical movement wherein the magnetic field assembly includes a cylindrical housing closed at the opposite end by end members, said housing and end members being formed of a magnetically permeable material and defining said magnetic frame, a pair of permanent magnets coaxially secured within the housing and respectively attached one each to each end member and having a small air gap between the adjacent ends, each of said magnets including a continuous central base at the center of the housing and outwardly projecting arms defined by a pair of slots, said arms being secured in abutting relation to the end members, a magnetic flux ring secured to the central inner wall of the housing in alignment with the central bases of the magnets and being split to define an air gap therein, said first coil means is a single layer self-supporting electrical coil slidably disposed for axial movement within the air gap defined by said flux ring and said magnets and having a center tap lead and end leads, said end members including similar supporting spider members secured at each end to the coil and having an outer ring and a central hub connected by radial arms extending through said slots and a central support rod secured to the hubs to support the spider members, the outer end of each radial arm projecting inwardly of the inner face of the outer ring to define a support ledge for the coil, said central support rod opening axially inwardly from each end, a support shaft secured to the one end cap and projecting partially into the aligned opening of the central support rod, an actuating rod secured within the opening of the opposite end of the central support rod and projecting outwardly through the opposite end member, three contact springs secured respectively at one end to the one spider member and at the opposite end to the adjacent end cap, said spring creating a minimal mechanical loading of the moving coil assembly, and means connecting said coil leads to the springs at the spider member.

5. The linear actuator of claim 4 wherein each of said contact springs constitutes a 270° convolution having a diameter substantially corresponding to the outer ring of a spider member and having the ends bent in opposite axial directions and being secured respectively within openings in the one spider and the adjacent end cap, said springs being angularly displaced to circumferentially space the corresponding bent ends, said coil having said leads connected to the springs at the spider with the first end lead connected to a first spring and a second end lead to a second spring and the center lead connected to a third spring, and terminal means mounted to the exterior of the end cap and having separate terminal means connected one each to one of said spring ends.

References Cited

UNITED STATES PATENTS

| | | | |
|---|---|---|---|
| 2,776,560 | 1/1957 | Erath et al. | 310—27 XR |
| 2,853,667 | 9/1958 | Booth et al. | 310—27 XR |
| 3,018,467 | 1/1962 | Harris | 310—27 XR |
| 3,074,269 | 1/1963 | Wohl | 310—27 XR |
| 3,149,254 | 9/1964 | Carter et al. | 310—12 |

OTHER REFERENCES

IBM Technical Disclosure Bulletin, Smeltzer, August 1961, p. 22.

MILTON O. HIRSHFIELD, *Primary Examiner.*

D. F. DUGGAN, *Assistant Examiner.*

U.S. Cl. X.R.

310—27; 318—135